United States Patent
Lee et al.

(10) Patent No.: US 7,081,937 B2
(45) Date of Patent: Jul. 25, 2006

(54) LIQUID CRYSTAL DISPLAY AND METHOD OF FABRICATING THE SAME WHEREIN USING PARTICULAR COMMON ELECTRODES

(75) Inventors: Dong Hoon Lee, Gyeongsangbuk-do (KR); Sun Yong Lee, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 148 days.

(21) Appl. No.: 10/878,537

(22) Filed: Jun. 29, 2004

(65) Prior Publication Data
US 2005/0052594 A1 Mar. 10, 2005

(30) Foreign Application Priority Data
Sep. 8, 2003 (KR) .................... 10-2003-0062763

(51) Int. Cl.
G02F 1/1343 (2006.01)
G02F 1/1333 (2006.01)

(52) U.S. Cl. .................... 349/139; 349/84; 349/161

(58) Field of Classification Search ................ 349/139, 349/84, 75, 147, 151, 110, 61, 44
See application file for complete search history.

(56) References Cited

U.S. PATENT DOCUMENTS 6,304,304 B1 * 10/2001 Koma .................... 349/33
6,335,717 B1 * 1/2002 Hasegawa et al. ............ 345/97

* cited by examiner

Primary Examiner—Andrew Schechter
Assistant Examiner—Mike Qi
(74) Attorney, Agent, or Firm—McKenna Long & Aldridge LLP

(57) ABSTRACT

A liquid crystal display (LCD) includes a liquid crystal panel including first and second substrates, and a liquid crystal layer filled with liquid crystals between the first and second substrates, a backlight module irradiating light on the liquid crystal panel, a driver controlling the liquid crystals to adjust an amount of light transmission, and a second common electrode formed on at least one of the first and second substrates, the second common electrode having a characteristic of a high heat emitting resistance.

18 Claims, 5 Drawing Sheets

LIQUID CRYSTAL DISPLAY AND METHOD OF FABRICATING THE SAME WHEREIN USING PARTICULAR COMMON ELECTRODES

This application claims the benefit of Korean Patent Application No. 2003-062763, filed on Sep. 8, 2003, which is hereby incorporated by reference.

BACKGROUND OF THE INVENTION

1. Field of the Invention

The present invention relates to a liquid crystal display (LCD), and more particularly, to an LCD that is capable of constantly maintaining response time of liquid crystal regardless of temperature, and a method of fabricating the same.

2. Description of the Related Art

Today, with rapid development of information technology, a flat panel display having advantages of slimness, lightweight and low power consumption is in great demand. The LCD is one such flat panel display that has superior visibility, lower power consumption and lower heat radiation when compared with a cathode ray tube (CRT) having the same screen size. For this reason, the LCD is widely used in hand-held devices, computer monitors and televisions. The LCD, along with plasma display panel (PDP) or field emission display (FED) is expected to be the next generation displays.

The LCD usually includes two substrates, each having an electrode for generating an electric field and facing each other, and a liquid crystal layer interposed therebetween. When a voltage is applied to the electrodes of the respective substrates, the LCD utilizes the electric field to control liquid crystal molecules to display images.

FIG. 1 is a schematic plan view showing an LCD according to the related art, and FIG. 2 is an enlarged cross-sectional view showing a region A of the LCD of FIG. 1. Referring to FIGS. 1 and 2, the related art LCD includes a liquid crystal panel 10, a backlight module (not shown) disposed at a lower portion of the liquid crystal panel 10 to irradiate light to the liquid crystal panel 10, and a driver 11 disposed at an outer region of the liquid crystal panel 10 to drive the liquid crystal panel 10.

The liquid crystal panel 10 includes a first substrate 15 and a second substrate 17 that are spaced apart by a predetermined interval and face each other. Also, a liquid crystal layer (not shown) is interposed between the first and second substrates 15, 17.

The first substrate 15 is provided with gate lines and data lines arranged in a matrix. A plurality of thin film transistors (TFTs) acting as switching elements are formed at intersections of the gate and the data lines. Each of the TFTs has a gate electrode connected to the gate line, a source electrode connected to the data line, and a drain electrode connected to a pixel electrode. The pixel region is defined by the TFT and the pixel electrode. Also, a common electrode line 16 is formed on the first substrate 15 to supply a predetermined common voltage.

The second substrate 17 is formed with a black matrix (BM) (not shown), a color filter layer 18 and a common electrode 19. The color filter layer 18 includes red (R), green (G) and blue (B) color filters that are arranged in sequence. The black matrix may be provided among the respective color filters in order to prevent light from being irradiated to an adjacent color filter. The common electrode 19 may be formed on the whole surface of the color filter layer 18.

The liquid crystal panel 10 is provided with a seal pattern 13, at corners of an outer region of which a conductive layer 14 is formed to connect the common electrode line 16 with the common electrode 19. Accordingly, a common voltage that is applied to the common electrode line 16 can be equally supplied to the common electrode 19 through the conductive layer 14.

The backlight module includes a lamp, a light guide plate for guiding light from the lamp to the liquid crystal panel 10, a reflective plate disposed under the light guide plate to reflect the light irradiated to a lower portion of the light guide plate, and a diffusion sheet disposed on the light guide plate to diffuse the light irradiated to the liquid crystal panel 10.

The driver 11 of FIG. 1 includes a printed circuit board (PCB) on which drive circuits are mounted to generate predetermined drive signals, and a drive integrated circuit (IC) 12 connected between the PCB and the liquid crystal panel 10 to supply the drive signals to the liquid crystal panel 10. A package method of the drive IC 12 may be classified into a chip on glass (COG), a tape carrier package (TCP), a chip on film (COF), etc. FIG. 1 is an exemplary view of the TCP.

In the LCD as constructed above, the TFTs of the liquid crystal panel 10 are turned on in response to the drive signals from the driver, and the data signals are applied to the pixel electrode, thereby forming a predetermined electric field. While variation of the liquid crystals is changed due to the electric field, an amount of light transmission is controlled to display images.

The liquid crystals may be typically used at a temperature ranging from −40° C. to 90° C. When the LCD is driven at a room temperature, the liquid crystals have no influence on the response time. However, a problem occurs when the LCD is driven at the low temperature in that the response time of the liquid crystals tend to be slow at a low temperature. Accordingly, if the LCD is driven at the low temperature, the response time of the liquid crystals is degraded, thus generating a flicker, or the like. As a result, picture quality is degraded.

SUMMARY OF THE INVENTION

Accordingly, the present invention is directed to an LCD that substantially obviates one or more problems due to limitations and disadvantages of the related art.

An object of the present invention is to provide an LCD and a method of fabricating the same, which are capable of maintaining a constant response time of liquid crystals regardless of temperature.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an LCD, which comprises a liquid crystal panel including first and second substrates, and a liquid crystal layer filled with liquid crystals between the first and second substrates, a backlight module irradiating light on the liquid crystal panel, a driver controlling the liquid crystals to adjust an amount of light transmission, and a second common electrode formed on one of the first and second substrates, the second common electrode having a characteristic of high heat emitting resistance.

In another embodiment of the present invention, an LCD comprises a first substrate including a thin film transistor, a second substrate including a black matrix, a color filter layer, a first common electrode and a second common electrode, the first electrode having heat emitting resistance lower than the second common electrode, a seal pattern bonding the first and second substrates by a predetermined interval, a first common electrode line formed on the first substrate corresponding to an outer region of the seal pattern, a first conductive layer connected between the first common electrode line and the first common electrode, a second common electrode line formed on an outermost region of the first substrate, and a second conductive layer connected between the second common electrode line and the second common electrode.

According to another aspect of the present invention, there is provided a method of fabricating an LCD comprising forming a second common electrode on a substrate by depositing a first transparent layer, forming a black matrix and a color filter layer on the second common electrode, and forming a first common electrode on the color filter layer by depositing a second transparent layer, the first transparent layer having lower heat emitting resistance than that of the second transparent layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
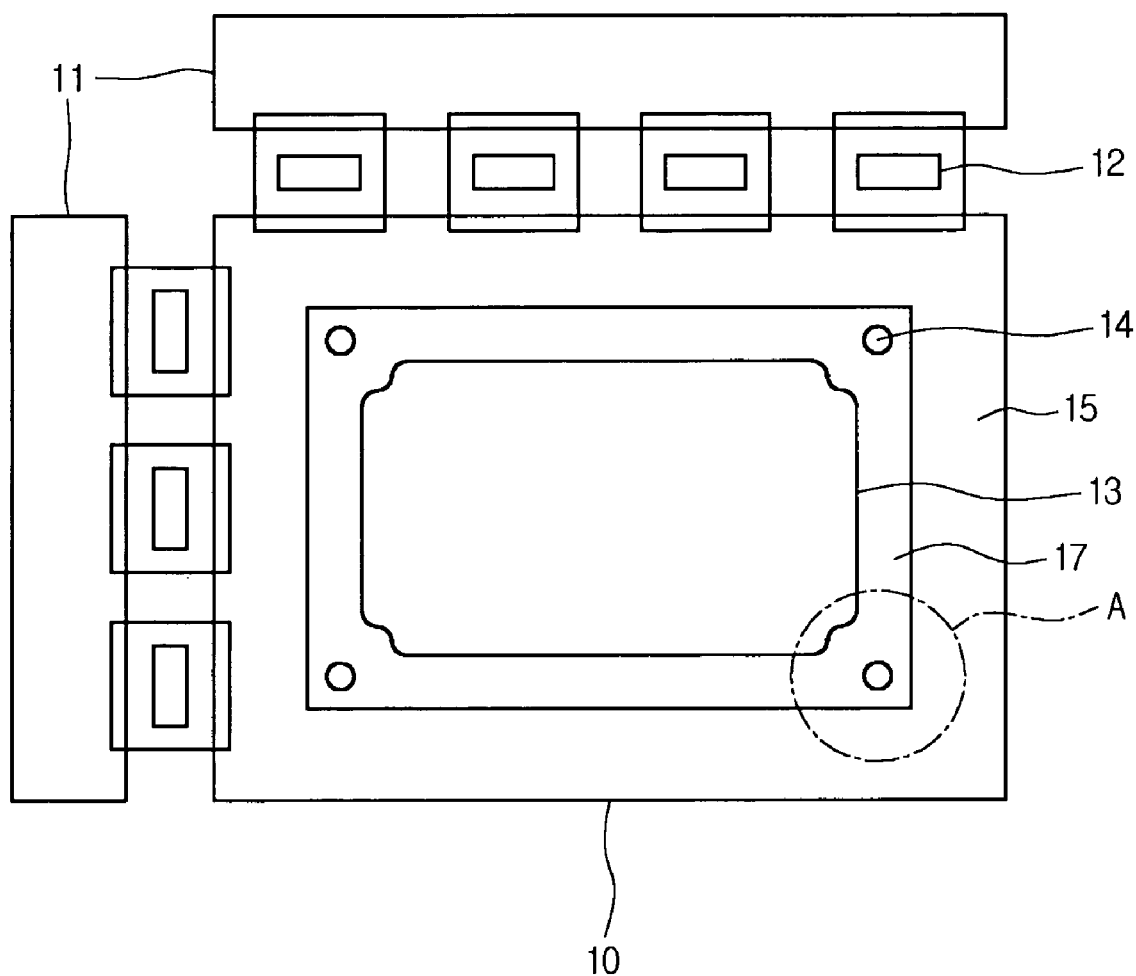
FIG. 1 is a schematic plan view of an LCD according to the related art.
Figure 2:
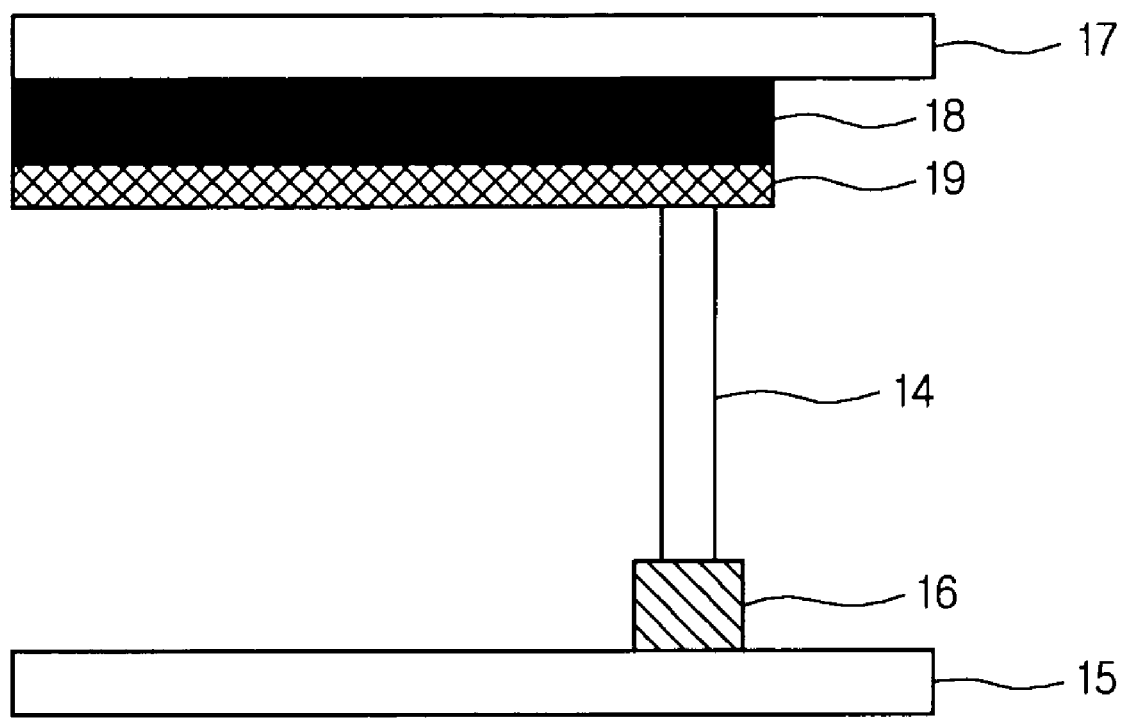
FIG. 2 is an enlarged view showing a region A of an outer region of the LCD of FIG. 1.
Figure 3:
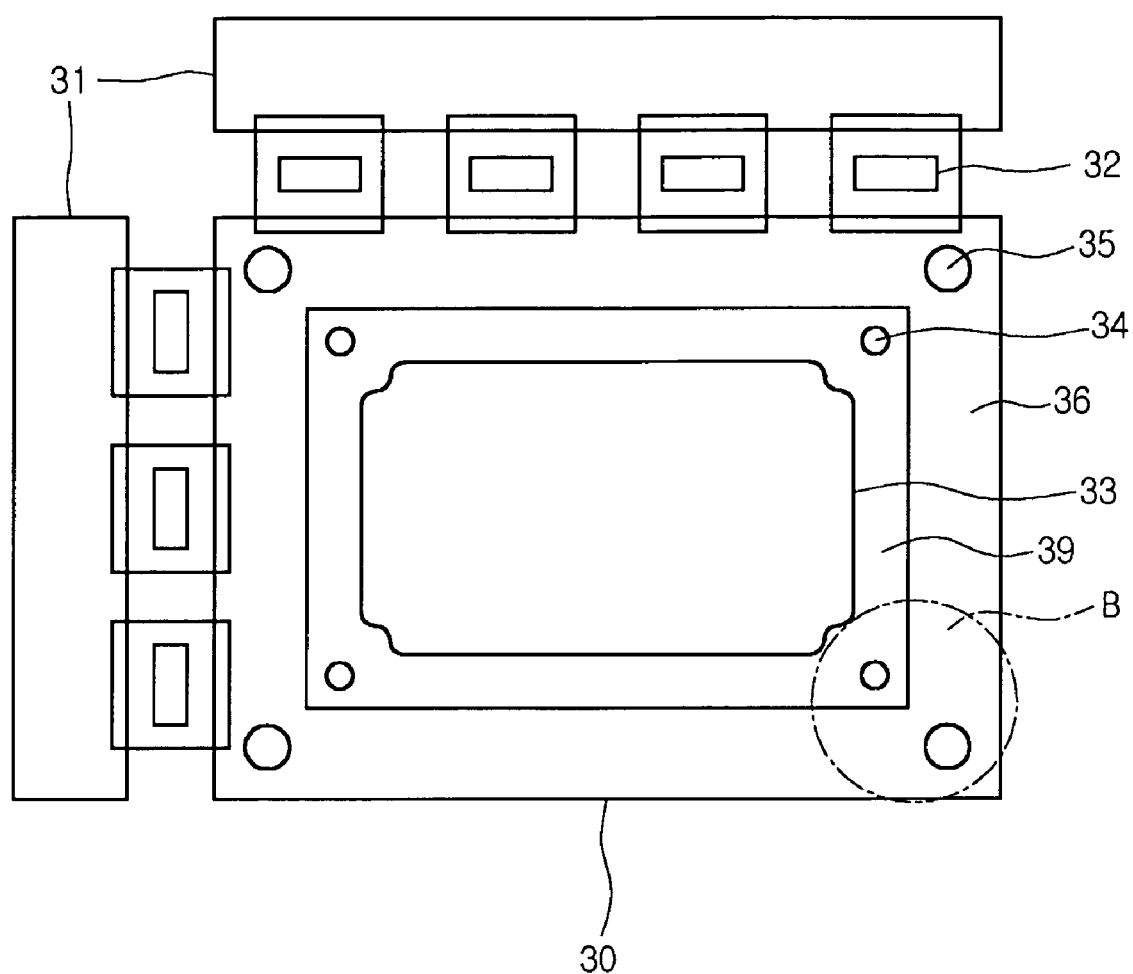
FIG. 3 is a schematic plan view of an LCD according to the present invention.
Figure 4:
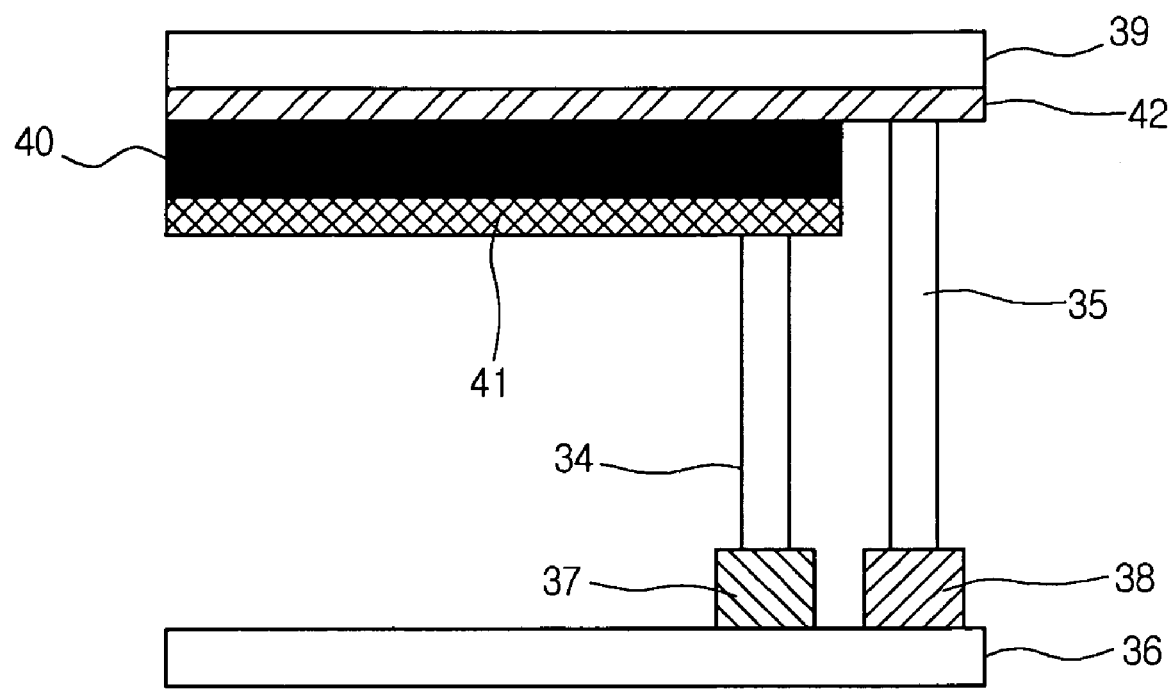
FIG. 4 is an enlarged view illustrating a region B of an outer region of the LCD of FIG. 3.

FIG. 3 is a schematic plan view of an LCD according to the present invention, and FIG. 4 is an enlarged view illustrating a region B of an outer region of the LCD of FIG. 3. Referring to FIGS. 3 and 4, the LCD includes a liquid crystal panel 30, a backlight module (not shown) disposed at a lower portion of the liquid crystal panel 30 to irradiate light to the liquid crystal panel 30, and a driver 31 disposed at an outer region of the liquid crystal panel 30 to drive the liquid crystal panel 30.

As shown in FIG. 4, the liquid crystal panel 30 includes a first substrate 36 and a second substrate 39 that are spaced apart by a predetermined interval and face each other. Also, a liquid crystal layer (not shown) interposed between the first and second substrates 36, 39.

The first substrate 36 is provided with gate and data lines that are arranged in matrix. Thin film transistors (TFTs) acting as switching elements are formed at intersections of the gate and the data lines. Each of the TFTs has a gate electrode connected to the gate line, a source electrode connected to the data line, and a drain electrode connected to a pixel electrode. A pixel region is defined by the TFT and the pixel electrode. Also, the first substrate 36 is provided with a first common electrode line 37 and a second common electrode line 38 to supply a predetermined common voltage. The first and second common electrode lines 37, 38 are spaced apart by a predetermined interval and may be formed on the same layer.

The second substrate 39 is provided with a second common electrode 42, a color filter layer 40 and a first common electrode 41 that are sequentially deposited thereon. The color filter layer 40 includes red (R), green (G) and blue (B) color filters that are arranged in sequence. A black matrix is provided among the respective color filters in order to prevent light from being irradiated to an adjacent color filter. The second common electrode 42 may be formed on the whole surface of the second substrate 39. The first common electrode 41 may be formed on the whole surface of the color filter layer 40. It is preferable that the second common electrode 42 has a characteristic of high heat emitting resistance. Also, both the first and second common electrodes 41, 42 may be formed of the same transparent conductive layer, such as an indium tin oxide (ITO) layer or the like.

When the same common voltage is applied to both the first and second common electrodes 41, 42, the second common electrode 42 emits higher heat than the first common electrode 41, thereby increasing the temperature of the LCD.

According to the present invention, the common voltage is applied to the first common electrode 41 when the LCD is driven at a room temperature. Therefore, a small amount of heat is emitted in the first common electrode 41 and the liquid crystals are reacted stably, thereby maintaining a constant response time.

In the present invention, when the LCD is driven at the low temperature, the common voltage is applied to the second common electrode 42 to generate high heat, thereby increasing temperature of the LCD. Therefore, the response time of the liquid crystals at the low temperature can be maintained at a constant similar to that of the room temperature response time, and thus prevent the response time of the liquid crystals from being degraded due to the low temperature.

The liquid crystal panel 30 is provided with a seal pattern 33, at corners of an outer region of which a first conductive layer 34 is formed to connect the first common electrode line 37 with the first common electrode 41. A second conductive layer 35 is formed at the outermost region of the liquid crystal panel 30 and spaced apart from the seal pattern 33 by a predetermined interval, to connect the second common electrode line 38 with the second common electrode 42. The first and second conductive layers 34, 35 may be formed of Ag dot, silver paste or the like. At least one or more of the first and second conductive layers 34, 35 may be provided.

The seal pattern 33 is provided to bond the first substrate 36 with the second substrate 39. Liquid crystals are injected into a space defined by the first and second substrates 36, 39 and the seal pattern 33.

Generally, the first substrate 36 is wider than the second substrate 39. A region for displaying an image can be defined by the seal pattern 33. The driver 31 is disposed around and connected to the first substrate 36. Accordingly, the common voltage that is supplied to the first common electrode line 37 can be simultaneously supplied to the first common electrode 41 through the first conductive layer 34. Also, the common voltage that is supplied to the second common electrode line 38 can be simultaneously supplied to the second common electrode 42 through the second conductive layer 35.

The backlight module includes a lamp, a light guide plate for guiding light from the lamp to the liquid crystal panel 30, a reflective plate disposed under the light guide plate to reflect the light irradiated to a lower portion of the light guide plate, and a diffusion sheet disposed on the light guide plate to diffuse the light irradiated to the liquid crystal panel 30.

The driver 31 of FIG. 3 includes a printed circuit board (PCB) on which drive circuits are mounted to generate predetermined drive signals, and a drive integrated circuit (IC) 32 connected between the PCB and the liquid crystal panel 30 to supply the drive signals to the liquid crystal panel 30. A package method of the drive IC 32 may be classified into a chip on glass (COG), a tape carrier package (TCP), and a chip on film (COF). FIG. 3 is an exemplary view of the TCP.

In the LCD as constructed above, the liquid crystal panel 30 is driven in response to the drive signals from the driver 31. At this point, the driver 31 supplies external data signals to the liquid crystal panel 30. In other words, if the drive signals are supplied to the gate lines arranged on the first substrate 36, the data signals are applied to the pixel electrodes under control of the TFTs and a corresponding common voltage is applied at the same time, thus forming an electric field. As a result, variation of the liquid crystals is changed and a predetermined image is displayed.

In a case where the LCD is driven at the room temperature, the common voltage is applied to the first common electrode line 37 and the first common electrode 41. On the contrary, in a case where the LCD is driven at the low temperature, the common voltage is applied to the second common electrode line 38 and the second common electrode 42. Thus, the second common electrode 42 has a characteristic of higher heat emitting resistance than the first common electrode 41, so that a considerable heat is generated in the second common electrode 42. As a result, temperature of the LCD is increased enough to maintain the response time constant, instead of degrading the response time due to the low temperature.

For this operation, a temperature sensor or the like, which can sense a surrounding temperature, may be attached to a predetermined portion of the LCD. Based on the temperature sensed by the temperature sensor, it can be determined that the common voltage is applied to the first common electrode 41 or the second common electrode 42. For example, if the sensed temperature is the room temperature, the common voltage is applied to the first common electrode 41. On the contrary, if the sensed temperature is the low temperature, the common voltage is applied to the second common electrode 42.

Figure 5A:
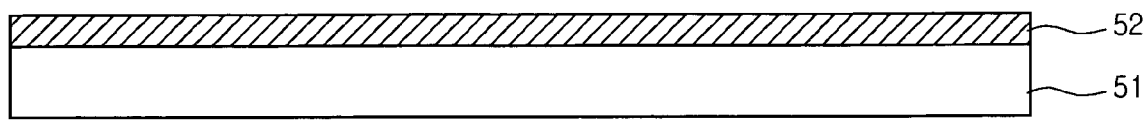
FIGS. 5A to 5C are cross-sectional views illustrating sequential procedures of fabricating the LCD according to the present invention.
Figure 5B:
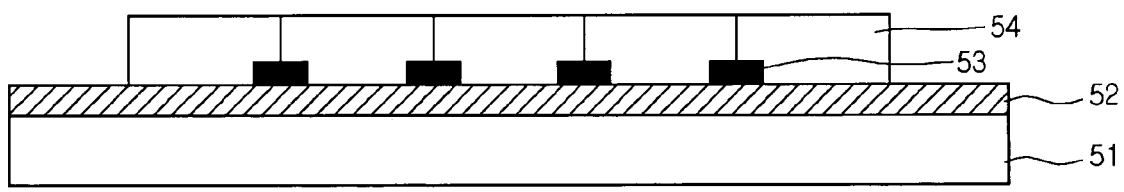
Figure 5C:
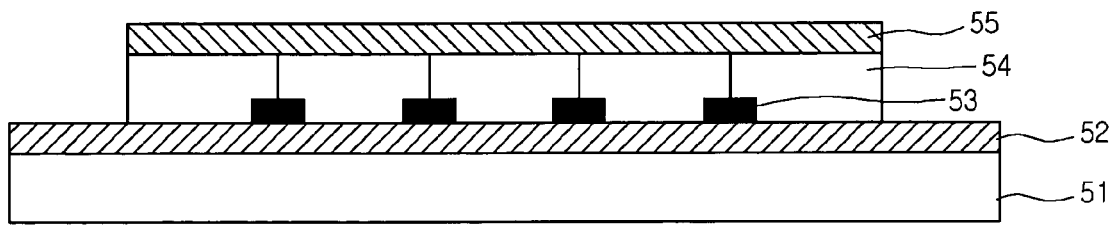

FIGS. 5A to 5C are cross-sectional views illustrating sequential procedures of fabricating the LCD according to the present invention. Referring to FIG. 5A, after a transparent glass substrate 51 is cleaned, an indium tin oxide (ITO) layer is deposited on the whole area of the glass substrate 51 using a sputtering process, thereby forming a second common electrode 52. The ITO layer has good characteristics in transmittance, conductivity, chemical and thermal stability, and a relatively high heat emitting resistance.

Referring to FIG. 5B, a chrome-based or carbon-based organic material is deposited on the second common electrode 52 using the sputtering process and is patterned using a mask, thereby forming a black matrix 53. At this point, the black matrix 53 on the second common electrode 52 is formed in a matrix configuration, thereby preventing leakage of light irradiated to the black matrix 53.

After the black matrix 53 is formed, a color filter layer 54 is patterned using a color resist, which reproduces colors when light is irradiated thereto. In other words, a red color resist is coated over the whole area of the second common electrode 52, thereby completely covering the black matrix 53. Then, only a specific region (for example, red region) of an upper portion of the coated color resist is exposed using a mask and a partial development is performed. After that, the red color resist whose photochemical structure is changed due to the exposure is developed using a developer and the developed red color resister is hardened to form a red color filter. Since the color resist generally has a negative characteristic, an unexposed region is removed. Then, a green color filter and a blue color filter are formed by repeating the above process of forming the red color filter.

Referring to FIG. 5C, an indium tin oxide (ITO) layer is deposited on the whole area of the color filter layer 54 using a sputtering process, thereby forming a first common electrode 55. The ITO layer has good characteristics in transmittance, conductivity, chemical and thermal stability, and a relatively high heat emitting resistance. Through the above processes, the second substrate 39 of FIG. 4 is thus formed.

As described above, the LCD of the present invention includes the first common electrode having a low heat emitting characteristic and the second common electrode having a high heat emitting characteristic. Thus, when the LCD is driven at the room temperature, the common voltage is applied to the first common electrode to generate a low heat. As a result, the response time of the liquid crystals can be maintained constant. Meanwhile, when the LCD is driven at the low temperature, the common voltage is applied to the second common electrode to generate a high heat. As a result, the temperature of the LCD is increased, thereby preventing the response time of the liquid crystals from being degraded due to the low temperature.

In other words, even when the LCD is driven at the low temperature, a constant response time can be maintained regardless of changes in temperature by increasing temperature of the LCD through the common electrode having a high heat emitting characteristic. Accordingly, the degradation in the response time of the liquid crystals due to the low temperature is prevented, thereby preventing the degradation of the picture quality due to the flicker or the like.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display (LCD), comprising:
   a liquid crystal panel including first and second substrates, and a liquid crystal layer filled with liquid crystals between the first and second substrates;
   a backlight module irradiating light on the liquid crystal panel;
   a driver controlling the liquid crystals to adjust an amount of light transmission;
   a first common electrode formed on at least one of the first and second substrates, on which a second common electrode is formed; and a first conductive layer formed between the first and the second substrate and connected to the first common electrode; and
   a second common electrode formed on at least one of the first and second substrates, the second common electrode having a characteristic of higher heat emitting resistance than the first common electrode.

2. The LCD according to claim 1, further comprising a second conductive layer formed between the first and second substrates at an outermost region of the liquid crystal panel and connected to the second common electrode.

3. The LCD according to claim 2, wherein at least one or more second conductive layer are provided.

4. The LCD according to claim 1, wherein the first common electrode has lower heat emitting resistance than that of the second common electrode.

5. The LCD according to claim 1, wherein at least one or more first conductive layer are provided.

6. A liquid crystal display (LCD), comprising:
   a first substrate including a thin film transistor;
   a second substrate including a black matrix, a color filter layer, a first common electrode and a second common electrode, the first common electrode having heat emitting resistance lower than that of the second common electrode;
   a seal pattern bonding the first and second substrates by a predetermined interval;
   a first common electrode line formed on the first substrate corresponding to an outer region of the seal pattern;
   a first conductive layer connected between the first common electrode line and the first common electrode;
   a second common electrode line formed on an outermost region of the first substrate; and
   a second conductive layer connected between the second common electrode line and the second common electrode.

7. The LCD according to claim 6, wherein the second common electrode is formed between the second substrate and the color filter layer.

8. The LCD according to claim 6, wherein the first common electrode is formed on the color filter layer.

9. The LCD according to claim 6, wherein the second common electrode has heat emission higher than that of the first common electrode when same common voltage is applied.

10. The LCD according to claim 6, wherein the first and second common electrodes are each formed of a transparent conductive layer.

11. The LCD according to claim 6, wherein the first and second conductive layers are formed of silver (Ag).

12. The LCD according to claim 6, wherein at least one or more first and second conductive layers are provided, respectively.

13. A method of fabricating an LCD, comprising:
    forming a second common electrode on a second substrate by depositing a second transparent conductive layer;
    forming a black matrix and a color filter layer on the second common electrode; and
    forming a first common electrode on the color filter layer by depositing a first transparent conductive layer, the first transparent conductive layer having lower heat emitting resistance than that of the second transparent conductive layer.

14. The method according to claim 13, wherein the first common electrode is formed over a whole area of the color filter layer and the second common electrode is formed over a whole area of the second substrate.

15. The method according to claim 13, wherein the first and second common electrodes are formed of indium tin oxide (ITO).

16. The method according to claim 13, further comprising:
    forming a first substrate including a plurality of thin film transistors;
    forming a seal pattern to bond the first and second substrates by a predetermined interval;
    forming a first common electrode line on the first substrate corresponding to an outer region of the seal pattern;
    forming a first conductive layer between the first common electrode line and the first common electrode;
    forming a second common electrode line on an outermost region of the first substrate; and
    forming a second conductive layer between the second common electrode line and the second common electrode.

17. The method according to claim 16, wherein the first and second conductive layers are formed of silver (Ag).

18. The method according to claim 16, wherein at least one or more first and second conductive layers are formed, respectively.

* * * * *